W. E. SUPERNAW.
SPRING WHEEL.
APPLICATION FILED JAN. 26, 1916.
1,184,787.
Patented May 30, 1916.
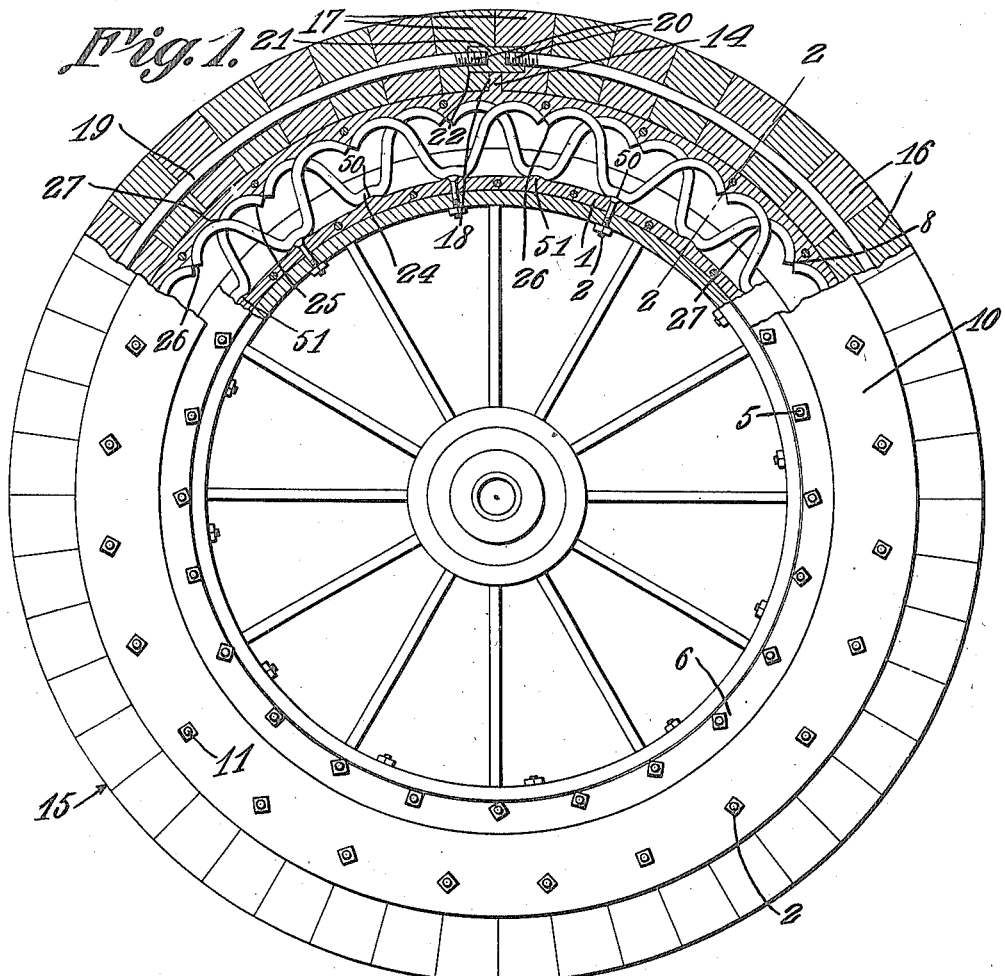
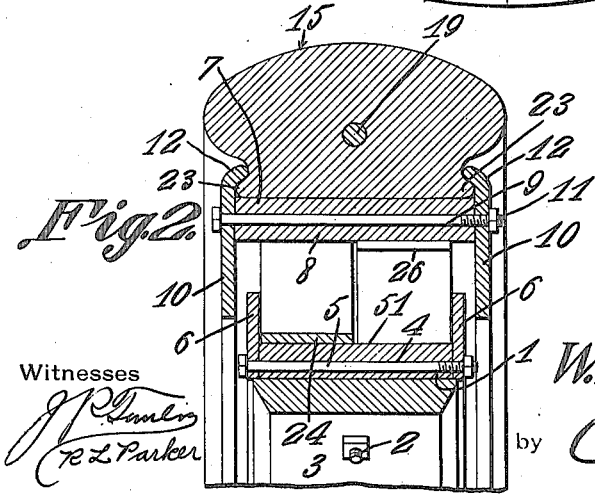
Witnesses
W. E. Supernaw, Inventor
by Attorneys

UNITED STATES PATENT OFFICE.

WILLIAM E. SUPERNAW, OF ELGIN, ILLINOIS.

SPRING-WHEEL.

1,184,787. Specification of Letters Patent. Patented May 30, 1916.

Original application filed July 3, 1915, Serial No. 37,961. Divided and this application filed January 26, 1916. Serial No. 74,374.

*To all whom it may concern:*

Be it known that I, WILLIAM E. SUPERNAW, a citizen of the United States, residing at Elgin, in the county of Kane and State of Illinois, have invented a new and useful Spring-Wheel, of which the following is a specification.

The device forming the subject matter of this application is a spring wheel and the present application discloses matter divided from my earlier application for Letters Patent on a tire, filed July 3, 1915, Serial No. 37,961.

The objects of the present invention are to improve the spring means which is introduced between the inner and outer rims, and to provide novel means for assembling the said spring means with the inner and outer rims.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows the invention in side elevation, parts being broken away, and parts appearing in section; Fig. 2 is a cross section on the line 2—2 of Fig. 1.

In carrying out the present invention there is provided an inner rim 1 secured by means of bolts 2 to a felly 3 which may be made of wood if desired. In the inner rim 1, transverse openings 4 are formed, the same being adapted to receive bolts 5 retaining annular side plates 6.

The invention contemplates the use of an outer rim 7 which may be made of metal, the rim 7 being provided with inwardly projecting, V-shaped lugs 8 having openings 9 receiving bolts 11 holding in place annular side plates 10, the side plates 10 being slidably overlapped on the side plates 6, and being provided with clencher flanges 12 which overhang the outer rim 7. At one or more points on its circumference, the outer rim 7 is supplied with an outwardly extended projection 14. A tire surrounds the outer rim 7 and is denoted generally by the numeral 15, the tire comprising a plurality of resilient blocks 16 which may be made of rubber, a rubber composition, or any other suitable substance. Certain of the tire blocks are denoted by the numeral 17 and the blocks 17 are equipped with recesses 18 receiving the projection 14, to the end that the tire may be prevented from creeping circumferentially on the outer rim 7. Through the constituent blocks 16—17 of the tire is extended a tightening member 19 which may be in form of a rod, the ends thereof being threaded as shown at 20 to receive a turnbuckle 21 which, it is to be observed is supported on the projection 14, the blocks 17 being recessed as shown at 22, to receive the ends of the turnbuckle. The tire blocks are provided with clencher beads 23 which are engaged by the clencher flanges 12 of the side plates 10.

Disposed between the rims 7 and 1 are two or more circumferentially extended sets of springs, disposed out of alinement transversely of the wheel. Each spring comprises an inwardly projecting bend 24 flexed outwardly to form a seat 50 engaging a transverse lug 51 on the inner rim 1 and a pair of outwardly projecting bends 25 engaging the rim 7, the outwardly projecting bends 25 terminating in inwardly projecting fingers 26 which abut against facing surfaces of the V-shaped lugs 8 on the outer rim 7. Since the springs in the respective circumferential sets are not alined transversely of the wheel, the outwardly projecting bends 25 of the springs of the respective sets are disposed in crossed relation, as shown at 27, when the wheel is viewed sidewise.

Owing to the specific form of the springs and to the manner in which the same coact with the inner and outer rims, the wheel will possess a maximum amount of resiliency, combined with the necessary rigidity to withstand abnormal strains. The tightening device comprising the rod 19 and the turnbuckle 21, together with the projection 14, form an important part of the structure. It is to be observed that the blocks 17 must be cut away to receive the projection 18, but since the turnbuckle 21 is supported on the projection 14, the turnbuckle, when the same is tightened up, will not distort the blocks 17 unduly or cut its way through the blocks, it being observed that the blocks 17 are of necessity weakened to a greater or less extent because they are recessed to receive the turnbuckle and to receive the projection 14.

Having thus described the invention, what is claimed is:—

In a spring wheel, an inner rim having outwardly projecting lugs on its outer surface; an outer rim having inwardly projecting lugs on its inner surface and alternating with the lugs of the inner rim; and springs disposed between the rims, the springs comprising inwardly projecting bends flexed outwardly to form seats receiving the lugs of the inner rim, the springs including outwardly projecting bends at the ends of the loops, the bends bearing against the outer rim, the outwardly projecting bends terminating in inwardly extending fingers, the fingers of each spring bearing upon the facing surfaces of lugs on the outer rim, and the fingers of adjoining springs bearing against opposed faces of the same lug on the outer rim.

In testimony that I claim the foregoing as my own, I have hereto affixed my signature in the presence of two witnesses.

WILLIAM E. SUPERNAW.

Witnesses:
   CHAS. SUPERNAW,
   ELDON LEE.